Figure 1:
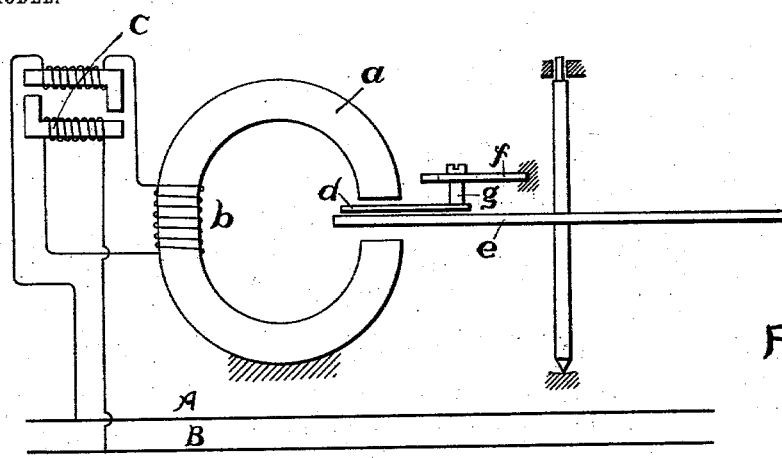

No. 745,461. PATENTED DEC. 1, 1903.
G. STERN & A. LOTZ.
ALTERNATING CURRENT METER.
APPLICATION FILED APR. 30, 1901.
NO MODEL.

Witnesses
Erving R. Gurney.
Benjamin B. Hull.

Inventors.
Albert Lotz,
George Stern,
by Albert B. Davis
Atty.

No. 745,461. Patented December 1, 1903.

UNITED STATES PATENT OFFICE.

GEORGE STERN AND ALBERT LOTZ, OF CHARLOTTENBURG, GERMANY, ASSIGNORS TO GENERAL ELECTRIC COMPANY, A CORPORATION OF NEW YORK.

ALTERNATING-CURRENT METER.

SPECIFICATION forming part of Letters Patent No. 745,461, dated December 1, 1903.

Application filed April 30, 1901. Serial No. 58,160. (No model.)

*To all whom it may concern:*

Be it known that we, GEORGE STERN and ALBERT LOTZ, subjects of the Emperor of Germany, residing at Charlottenburg, Germany, have invented certain new and useful Improvements in Alternating-Current Meters, of which the following is a specification.

Our invention relates to alternating-current induction-meters, and has for its object to provide a new and improved means for accurately adjusting the phase relation of the flux in the magnetic circuit of a magnet excited from an alternating-current source.

More specifically stated, our invention comprises a novel means for adjusting the phase relation of the flux due to the potential magnet in an alternating-current induction-meter in such a manner that an exact ninety-degree relation between the magnetizations due to the shunt and series windings may readily be obtained.

In alternating-current induction-wattmeters it is necessary in order that a correct registration of the energy consumed in the circuit to which the meter is connected may be obtained under all conditions of load that the shunt and series magnetizations shall be displaced by ninety degrees from one another on non-inductive load, or, what amounts to the same thing, that the shunt magnetization shall be displaced by substantially ninety degrees from the impressed electromotive force in the circuit to which the meter is connected.

The inclusion of an inductance-coil in the circuit of the winding of the potential-magnet will operate to produce a shunt-field which lags by nearly ninety degrees behind the impressed electromotive force; but since a true ninety-degree relation cannot be obtained by the use of an inductance-coil alone many expedients have been adopted which, in connection with the inductance-coil, operate to produce the required ninety-degree relation. For example, the metallic rotating body which constitutes the armature of the meter and is traversed by the flux due to the potential-magnet may of itself furnish a means for increasing up to the desired amount the phase displacement of the flux due to a potential-magnet which has included in its circuit an inductive resistance, since the currents which are generated in a short-circuited armature by the flux passing therethrough react on the flux in such a manner as to retard the same. It is therefore possible, by suitably proportioning the armature in an induction-meter, to obtain the desired phase displacement without the use of any separate phase-displacing device other than the usual inductive resistance. Such an arrangement is, however, open to the objection that the rotating system must be made of large dimensions in order to furnish sufficient conductivity, and is therefore heavier than is desirable, and to the further objection that the flux due to the series magnet is also similarly retarded.

The present invention avoids the difficulties above specified by introducing a fixed body of good conducting material, separate from the meter-armature, in an air-gap in the magnetic circuit of the potential-magnet only.

Our invention will be better understood by reference to the following description, taken in connection with the accompanying drawings, in which—

Figure 2:
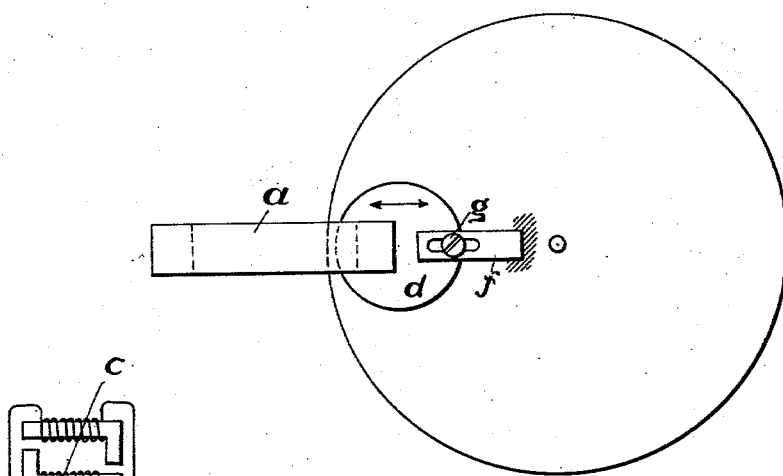

Figure 1 represents diagrammatically the application of our invention to an alternating-current induction-meter, only such parts being shown as are necessary for the understanding of the operation of our invention. Fig. 2 is a view in plan of the meter-disk and magnet system of Fig. 1, and Fig. 3 shows a modified construction.

Referring to the drawings, *a* represents the core of a potential-magnet mounted on a suitable support, so that its poles include a portion of a meter-disk *e*, rotatably supported on a shaft, it being understood that the complete meter comprises, in addition to the parts shown, a series magnet and suitable retarding and registering means. The winding of the potential-magnet is indicated at *b*, and an inductance-coil *c* is shown included in circuit with the said coil, this circuit being connected across the mains A B of an alternating-current-supply system. The arrangement already described will operate, as already stated above, to produce a shunt magnetization lagging by nearly ninety degrees behind the impressed electromotive force of the circuit to which the meter is connected. In order to increase the phase displacement up to exactly ninety degrees, we have provided a fixed body $d$ of good conducting material adjustably mounted in the magnetic circuit of the potential-magnet. As shown in Figs. 1 and 2 of the drawings, this body of conducting material is in the form of a disk mounted between the poles of the potential-magnet adjacent to the armature of the meter, its position being so chosen that it lies symmetrically with respect to a plane passing through the middle of the poles of the potential-magnet and the shaft on which the meter-armature is mounted. In order that the disk may be adjusted radially, so as to increase or diminish its effect upon the shunt magnetization, it is adjustably secured to a slotted support $f$ by means of a screw $g$. By means of this arrangement the result is obtained that the phase displacement of the shunt magnetization may be increased without affecting the magnetization due to the series magnet. The disk $d$ should preferably be somewhat larger than the polar surface of the shunt-magnet.

Figure 3:
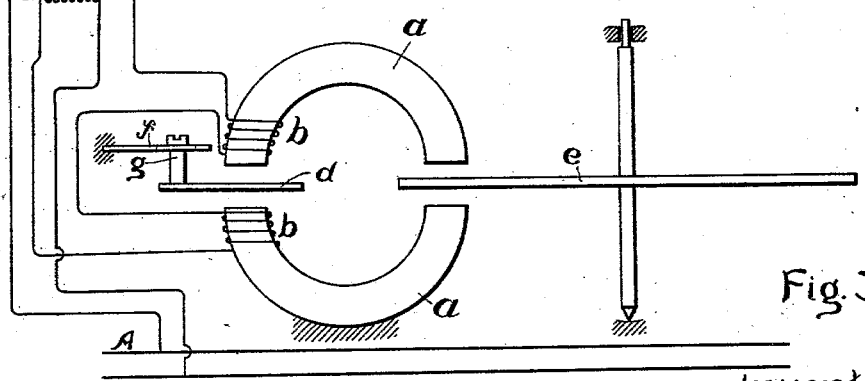

Since the function of the disk is to increase the phase displacement of the magnetization due to the shunt-magnet, it is evidently unnecessary that it should be mounted in the air-gap in which the meter-armature rotates, and in Fig. 3 we have shown a construction in which the potential-magnet is provided with another air-gap, in which the disk $d$ is adjustably mounted in the same manner as is shown in Figs. 1 and 2.

It will be noted that since the disk is symmetrically mounted with respect to a plane passing through the middle of the poles of the shunt-magnet and the axis on which the meter is mounted the number of lines of force due to the shunt-magnet on each side of this plane will be equal. The disk will therefore have no effect in producing a rotation of the meter-armature. The adjustment which we have provided is along a radial line, as indicated by the double-headed arrow in Fig. 2, and does not effect the symmetrical arrangement of the disk with respect to the plane before mentioned, but does operate to cause the disk to be traversed by more or less of the lines of force due to the potential-magnet, and therefore produces a greater or a less retarding effect upon the shunt magnetization.

The arrangement which we have devised is not to be confounded with the arrangement which has been described by Elihu Thomson, in which a copper body mounted unsymmetrically with respect to the poles of an electromagnet operates to produce a turning moment on a disk armature arranged to rotate between the said poles. This latter arrangement is commonly utilized in meters for producing a torque sufficient to compensate for the frictional resistance of the meter. For example, in the meter invented by Blathy two copper strips joined together by a thin bridge are arranged parallel to the meter-armature in the path of the lines of force of the shunt-magnet, so that a body of copper always lies under a portion of the shunt-pole. The joined copper strips are so mounted that they may be simultaneously displaced in the direction of a chord of the circle of the meter-armature. These copper strips lie one on either side of a radial line passing through the axis on which the meter-armature turns and the middle of one of the poles of the potential-magnet, and they operate to create two turning moments in opposite directions, which are equal, so long as the same number of lines of force traverse the copper strips on both sides of the radial line. If, however, the rigidly-joined strips are displaced in one direction or the other, one will be cut by more lines of force than the other, and a resultant turning moment in one direction or the other will be produced. Such an arrangement serves to produce an adjustable turning moment, but cannot be used as a means for producing a predetermined phase displacement of the flux due to the potential-magnet, since the number of lines of force which traverse the whole bridge is the same in every position of the bridge.

Our invention differs from the above in that it provides a means for adjusting the phase displacement of the flux due to the potential-magnet without producing any turning moment on the meter-disk.

While we have described our invention as applied to a meter having a disk armature, it will be evident that it may equally well be used in connection with an armature of the bell or cylinder type. Also it is evident that many modifications in construction may be made without departing from the spirit of our invention.

What we claim as new, and desire to secure by Letters Patent of the United States, is—

1. In an alternating-current induction-meter, a body of good conducting material adjustably mounted in the path of the flux due to one of the meter-windings and so positioned that no turning moment will be produced thereby on the meter-armature, the said body being so mounted that it may be moved laterally with reference to the said winding so as to include more or less of the lines of force due to the said winding.

2. In an alternating-current induction-meter, a body of good conducting material adjustably mounted in the path of the flux due to the shunt-winding of the meter and so positioned that no turning moment will be produced thereby on the meter-armature, the said body being so mounted that it may be moved laterally with reference to the said winding so as to include more or less of the lines of force due to the said winding.

3. As a means for adjusting the phase of the shunt magnetization in an alternating-current induction-meter, a body of good conducting material adjustably mounted between the poles of the shunt-magnet, in proximity to the meter-armature, in such a manner that it produces no turning moment on the meter-armature.

4. As a means for adjusting the phase of the shunt magnetization in an alternating-current induction-meter, a body of good conducting material mounted between the poles of the shunt-magnet, in proximity to the meter-armature, in such a manner that it produces no turning moment on the same, and means for adjusting said body to include more or less of the lines of force due to the shunt-magnet.

5. As a means for adjusting the phase of the shunt magnetization in an alternating-current induction-meter, a body of good conducting material mounted between one of the poles of the shunt-magnet and the meter-armature in such a manner that it produces no turning moment on the said armature, and means for adjusting said body to include more or less of the lines of force due to the shunt-magnet.

6. As a means for adjusting the phase of the shunt magnetization in an alternating-current induction-meter, a body of good conducting material adjustable along a radial line between the poles of the shunt-magnet and mounted symmetrically with respect to a plane passing through the middle of the magnet-poles and the armature-shaft.

In witness whereof we have hereunto set our hands this 12th day of April, 1901.

GEORGE STERN.
ALBERT LOTZ.

Witnesses:
WOLDEMAR HAUPT,
HENRY HASPER.